United States Patent Office 3,679,470
Patented July 25, 1972

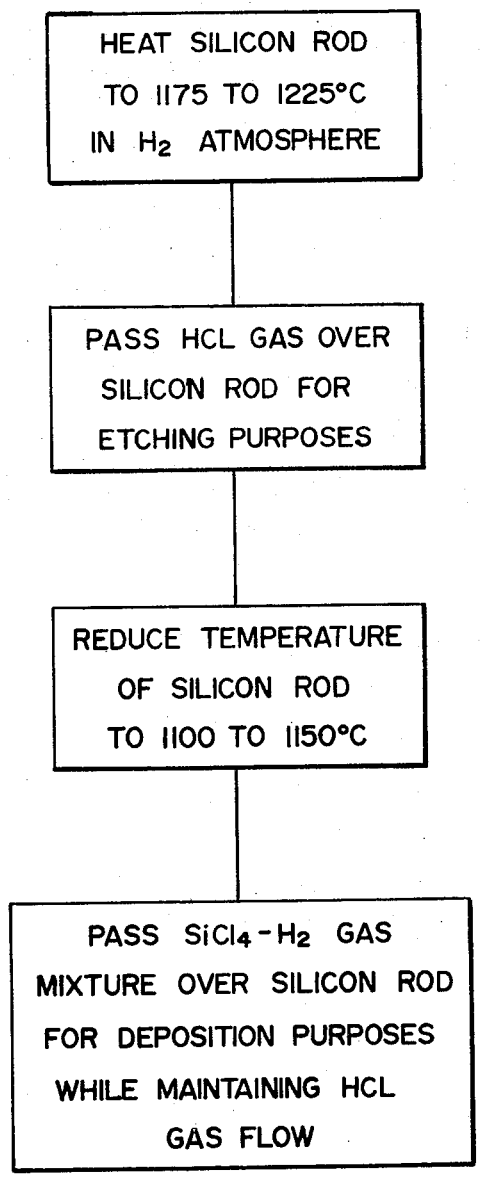

3,679,470
METHOD FOR PRODUCING HIGH PURITY MONOCRYSTALLINE SILICON
Leo C. Rogers and Roger G. Nikirk, Phoenix, and Alfred J. Heitz, Mesa, Ariz., assignors to Motorola, Inc., Franklin Park, Ill.
Filed Mar. 13, 1970, Ser. No. 19,269
Int. Cl. C23c 11/08; H01l 7/50
U.S. Cl. 117—200                                     3 Claims

ABSTRACT OF THE DISCLOSURE

A method of producing high purity monocrystalline silicon. A silicon rod is heated in a reducing atmosphere and an etchant passed thereover. After the etchant has etched the surface of the silicon rod, a gaseous mixture of a silicon halogenide and a reducing agent is passed over the silicon rod while the flow of the etchant is continued. The flow of the etchant may continue during the growth of the monocrystalline silicon rod or it may be discontinued a short time after the silicon halogenide gaseous mixture has been introduced.

BACKGROUND OF THE INVENTION

This invention relates to a method of producing silicon and more particularly to a method of producing high purity monocrystalline silicon.

Monocrystalline silicon has, heretofore, been produced commercially by converting polycrystalline silicon to monocrystalline silicon by using one of the conventional methods such as the Czochralski method. Attempts to obtain monocrystalline silicon directly by vapor deposition or by decomposition of a silicon halogenide on a rod of single crystal silicon have had limited success. The problem in forming the monocrystalline silicon directly by vapor decomposition of the silicon halogenide has been the presence of polycrystalline silicon which formed during the beginning of silicon deposition on the silicon rod.

SUMMARY OF THE INVENTION

It is a primary object of this invention to provide a method for the vapor deposition of monocrystalline silicon on a monocrystalline silicon rod.

It is another object of this invention to provide a method of forming polycrystalline-free monocrystalline silicon.

These and other objects are accomplished by a method in which a gaseous mixture containing silicon halogenide and hydrogen is introduced into a stream of a gaseous etchant which is passing over a heated silicon rod. The first step in the process is to pass a gaseous etchant over a heated monocrystalline silicon rod in order to etch several microns of material from the surface of the rod. Then a gaseous mixture containing a silicon halogenide and hydrogen is introduced into the system and mixed with the gaseous etchant so that a mixture containing the etchant, silicon halogenide and hydrogen pass over the silicon rod. After a period of time, for example, ten minutes to one hour, the flow of the etchant may be discontinued if desired, reduced, or it may be continued until the silicon rod has grown to the desired size.

IN THE DRAWING

The drawing is a flow diagram depicting the process of this invention.

DESCRIPTION OF AN ILLUSTRATIVE EMBODIMENT

One or more silicon cores or rods having an original diameter of the order of five millimeters are placed in a reaction chamber which is in the form of a quartz bell jar having the appropriate inlets for the reactant gases and exit ports for the used gases. The silicon cores are made of monocrystalline silicon. One of their crystal axes, such as the <111> axis <110> axis or the <100> axis is oriented in the direction of the rod axis. The silicon cores are preheated to temperatures between 400° and 600° C. by any conventional method such as external heating of the bell jar or the method described in the patent to Benedict, U.S. 3,438,810. At temperatures in this range, the monocrystalline silicon rods become self-conductive. The silicon rods are then heated by passing electricity therethrough.

The reaction chamber is evacuated until a pressure of less than 1 micron is obtained. After evacuation, the reaction chamber is purged with pure hydrogen. In this hydrogen atmosphere the silicon rods are heated, preferably, to a temperature in the range of 1175° to 1225° C. At this temperature, a gaseous etchant, such as HCl, is introduced into the reaction chamber and passed over the silicon rods in order to etch the surface of the rods. This method of etching silicon is disclosed in detail in the patent to Corrigan U.S. 3,243,323. The HCl gas is diluted with hydrogen and the preferred molar concentration of the HCl gas is of the order of two percent. The concentration of the HCl in the hydrogen mixture may vary from the preferred concentration of two percent. The flow rate of this mixture is about 50 l./min. The surface of silicon core is etched at this elevated temperature until from 1 to 30 microns of silicon have been removed. The preferred amount of material that is removed is of the order of 10 to 15 microns. While etching at a temperature of 1175° to 1225° C. is preferred because of the high etch rate at these temperatures, etching may be carried out if desired at temperatures below 1175° C.

In accordance with this invention, a gaseous mixture containing a reducing agent such as hydrogen and a silicon halogenide such as silicon tetrachloride, trichlorosilane or dichlorosilane is introduced into the reaction chamber at a given rate while the etchant is still etching the silicon rod. Just before the gaseous mixture containing the silicon halogenide is introduced into the reaction chamber, the temperature of the silicon rod is changed if necessary to a temperature between 1100° and 1175° C., the temperature being dependent upon the silicon halogenide being used. For example, with silicon tetrachloride, the temperature for growing the monocrystalline silicon on the silicon rod is 1100° to 1150° C. with the preferred temperature being about 1125° C. When the silicon halogenide is trichlorosilane, the temperature range is 1125° to 1175° C. with the preferred temperature being about 1150° C.

The gaseous mixture containing the silicon halogenide is introduced at a given flow rate and at a given mole ratio of the silicon halogenide. A flow rate for the gaseous mixture is about 5 l./min. The gaseous mixture contains between 5 to 12 mole percent silicon tetrachloride or 5 to 10 mole percent trichlorosilane. When these mole ratios are used, monocrystalline silicon is deposited on the monocrystalline silicon core. At mole ratios outside of those given above, the deposited silicon contains both polycrystalline silicon and monocrystalline silicon.

The temperature range of 1100°–1175° C. for growing the silicon is important, since temperatures higher than this result in the deposited silicon containing polycrystalline silicon.

The etchant gas may be continued throughout the entire monocrystalline silicon deposition time period or the flow of the etchant gas may be diminished gradually any time after about 10 minutes after the silicon halogenide has been introduced. If the etchant gas flow is to be stopped completely, it can be reduced, for example, after 1 hour from 2 mole percent to 1 mole percent HCl and then stopped completely after 2 hours. When silicon tetrachloride is used, the etchant may be reduced from 2 mole percent to 1 mole percent HCl at the same time the silicon tetrachloride is introduced. In this case the flow of the etchant could be either continued for the entire run or completely stopped after 1 hour.

In accordance with this invention, a silicon halogenide-hydrogen gaseous mixture is introduced at a given rate suddenly or abruptly while the silicon core is being etched with hydrogen chloride vapor. This sudden introduction of a substantial quantity of the silicon halogenide mixture at a given flow rate results in a graduated change from etching the core surface to depositing monocrystalline silicon on the surface. This gradual change from etching to deposition avoids the deposition of polycrystalline silicon on the core surface which is frequently formed if hydrogen chloride is not present in the system prior to the introduction of the silicon halogenide. The presence of hydrogen chloride vapor in the system is required prior to the introduction of silicon halogenide. The presence of hydrogen chloride vapor in the system is also required after the introduction of the silicon halogenide mixture for a time period which is sufficient for the gradual transition from etching to deposition.

EXAMPLE NO. 1

A silicon rod 34 inches long having a diameter of 4 to 5 mm. was heated to a temperature of 1175° C. in a hydrogen atmosphere. A stream of an HCl-$H_2$ gas mixture containing 2 mole percent HCl was passed over the rod for 30 minutes at a flow rate of about 50 liters per minute which removed about 10 to 12 microns from the surface of the silicon rod. The temperature was reduced to 1125° C. A $SiCl_4$-$H_2$ mixture containing 7 mole percent $SiCl_4$ and having a flow rate of 5 liters per minute was introduced into the system to mix with the HCl-$H_2$ gas mixture. The resultant gaseous mixture deposited a layer of monocrystalline silicon on a silicon rod having the same orientation as the rod, that is a <111> crystal structure configuration. One hour after the $SiCl_4$-$H_2$ gas mixture had been introduced, the HCl gas mixture concentration was reduced to 1 mole percent HCl. Two hours after the $SiCl_4$-$H_2$ gas mixture had been introduced, the HCl gas mixture was stopped completely. The flow of the $SiCl_4$-$H_2$ gas mixture was continued for 200 hours to yield a silicon rod of monocrystalline silicon having a cross sectional area of about 3 square inches.

EXAMPLE NO. 2

A process similar to that described in Example No. 1 was used with a $SiHCl_3$-$H_2$ mixture containing 5 mole percent $SiHCl_3$. This run was carried out for a period of 170 hours with the silicon rod temperature of 1150° C. to yield a monocrystalline silicon rod having a cross sectional area of about 3 square inches.

What is claimed is:
1. The method of producing monocrystalline silicon of high purity comprising the steps of
   heating a monocrystalline silicon rod in a hydrogen atmosphere to a temperature of about 1175° to 1225° C.,
   passing gaseous HCl over said rod until the surface of said rod has been etched to remove 1 to 15 microns of silicon,
   lowering the temperature of said silicon rod to a temperature between 1100° and 1175° C., and
   abruptly injecting a gaseous mixture at a given rate over said rod while continuing unaltered the flow of said gaseous HCl, said gaseous mixture comprising hydrogen and at least 5 mole percent of a silicon halogenide,
   diminishing the flow of said gaseous HCl after said gaseous mixture is introduced.

2. The method of producing monocrystalline silicon of high purity comprising the steps of
   heating a monocrystalline silicon rod in a hydrogen atmosphere to a temperature of about 1175° to 1225° C.,
   passing gaseous HCl over said rod until the surface of said rod has been etched to remove 1 to 15 microns of silicon,
   lowering the temperature of said silicon rod to a temperature between 1100° and 1150° C.,
   abruptly injecting a gaseous mixture at a given rate over said rod while continuing unaltered the flow of said gaseous HCl, said gaseous mixture comprising hydrogen and 5 to 12 mole percent of silicon tetrachloride,
   diminishing the flow of said gaseous HCl after said gaseous mixture is introduced.

3. The method of producing monocrystalline silicon of high purity comprising the steps of
   heating a monocrystalline silicon rod in a hydrogen atmosphere to a temperature of about 1175° to 1225° C.,
   passing gaseous HCl over said rod until the surface of said rod has been etched to remove 1 to 15 microns of silicon,
   lowering the temperature of said silicon rod to a temperature between 1125° and 1175° C., and
   abruptly injecting a gaseous mixture at a given rate over said rod while continuing unaltered the flow of said gaseous HCl, said gaseous mixture comprising hydrogen and 5 to 10 mole percent of trichlorosilane,
   diminishing the flow of said gaseous HCl after said gaseous mixture is introduced.

References Cited
UNITED STATES PATENTS 3,171,755   3/1965   Reuschel et al. _____ 117—200
3,243,323   3/1966   Corrigan et al. _____ 148—175

JACOB H. STEINBERG, Primary Examiner

U.S. Cl. X.R.

117—106 A, 201; 156—17